United States Patent [19]
Kammerer, Jr. et al.

[11] 3,827,258
[45] Aug. 6, 1974

[54] DISCONNECTIBLE TORQUE AND AXIAL LOAD TRANSMISSION APPARATUS

[75] Inventors: Archer W. Kammerer, Jr.; Gary R. Johnson, both of Houston, Tex.

[73] Assignee: Baker Oil Tools, Inc., Los Angeles, Calif.

[22] Filed: Dec. 22, 1972

[21] Appl. No.: 317,656

Related U.S. Application Data

[60] Division of Ser. No. 190,181, Oct. 18, 1971, Pat. No. 3,753,431, which is a division of Ser. No. 132,993, April 2, 1971, abandoned, which is a continuation-in-part of Ser. No. 23,700, March 30, 1970, abandoned.

[52] U.S. Cl.............. 64/23, 166/214, 175/317, 285/18, 285/315, 403/321
[51] Int. Cl............................................ F16d 3/06
[58] Field of Search ............ 285/18, 308, 314, 315, 285/321; 175/317; 403/321, 325; 166/214; 64/4, 23, 6

[56] References Cited
UNITED STATES PATENTS

| | | | |
|---|---|---|---|
| 2,776,015 | 1/1957 | Bielstein | 285/308 |
| 2,988,145 | 6/1961 | Clark, Jr. | 175/317 |
| 3,357,206 | 12/1967 | Christie | 64/4 |
| 3,367,140 | 2/1968 | Stillwagon, Jr. | 64/23 |
| 3,488,031 | 1/1970 | Bezner et al. | 285/18 |

Primary Examiner—Samuel Scott
Assistant Examiner—Randall Heald
Attorney, Agent, or Firm—Bernard Kriegel

[57] ABSTRACT

A tubular apparatus including an inner tubular member piloted within an outer tubular member, the members having a releasable connection through which torque and axial loads can be transmitted, such connection being readily disconnected, when desired, to permit axial separation between the members.

12 Claims, 28 Drawing Figures

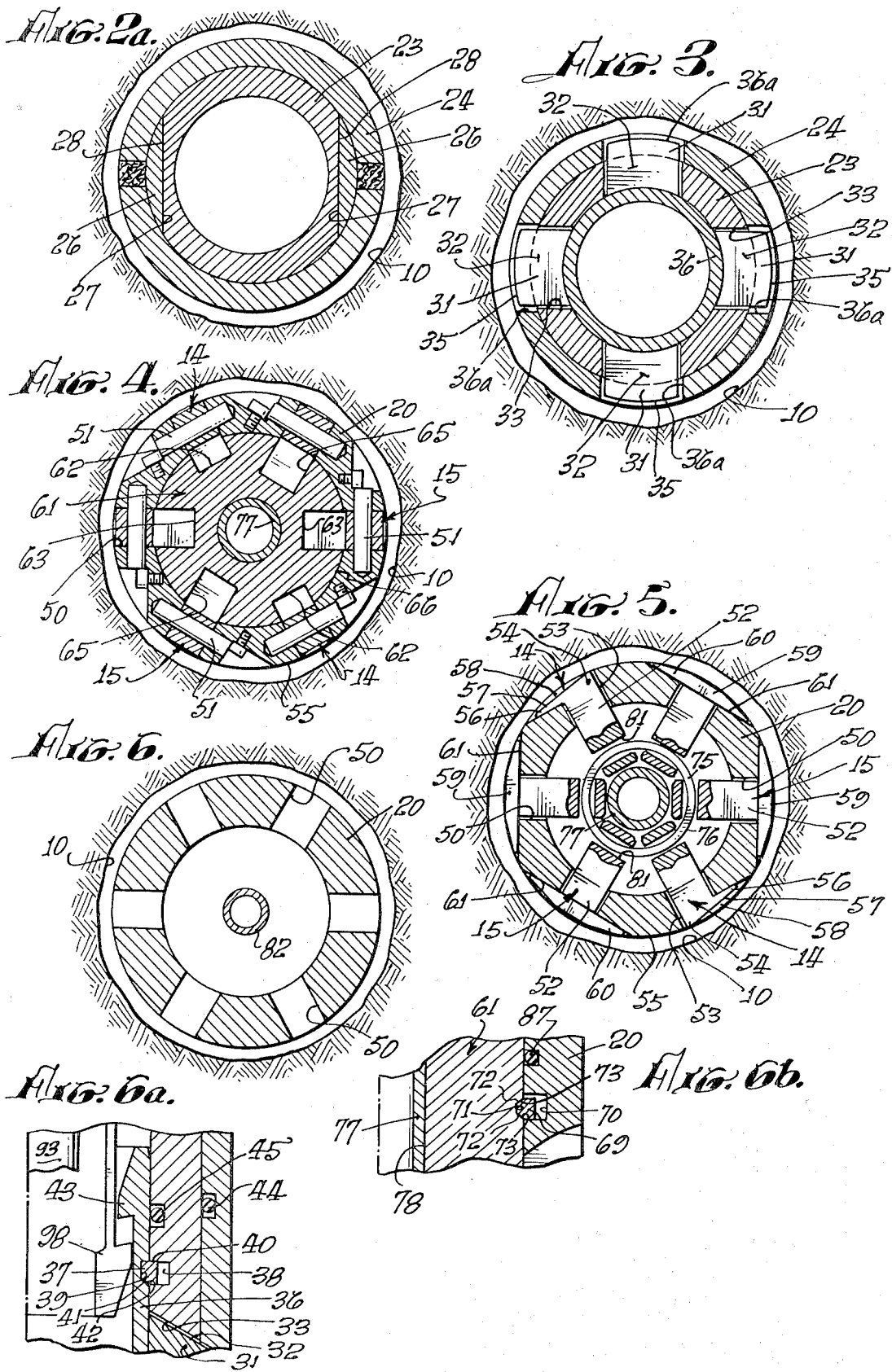

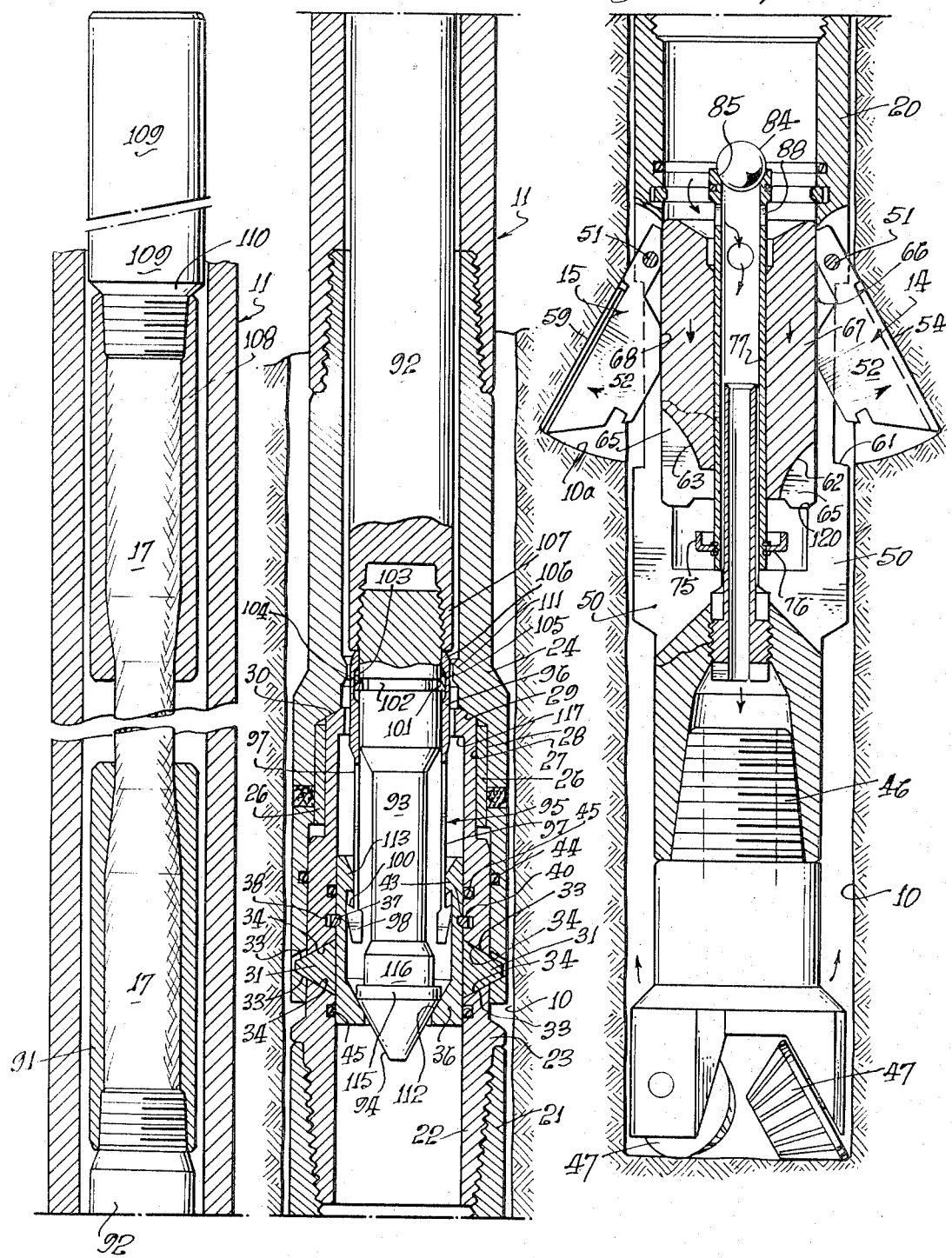

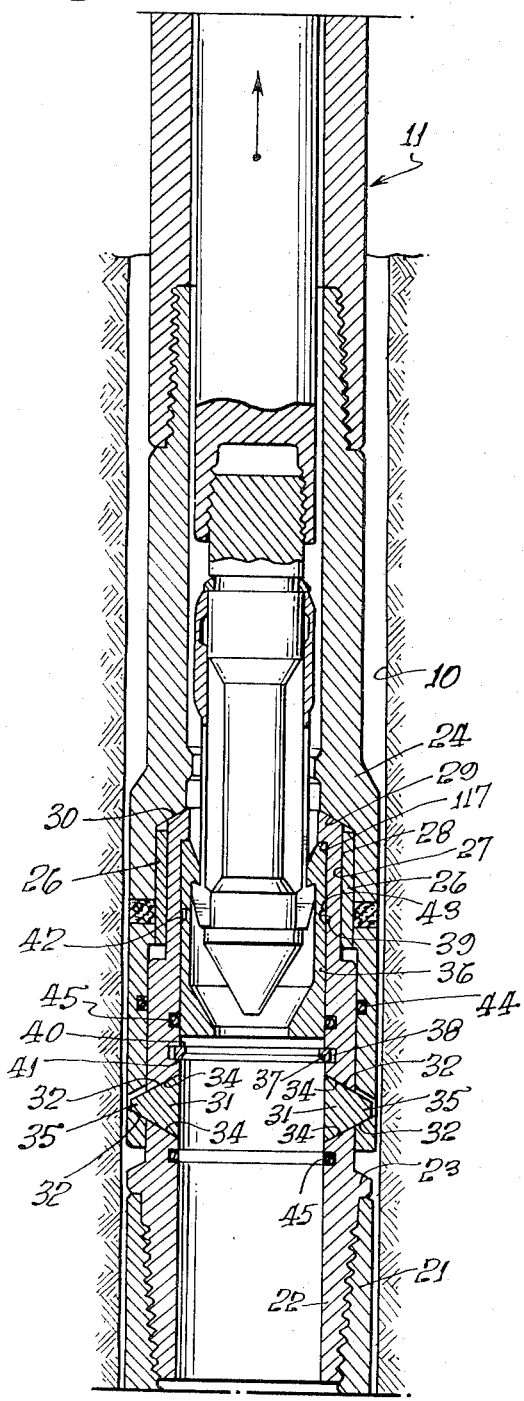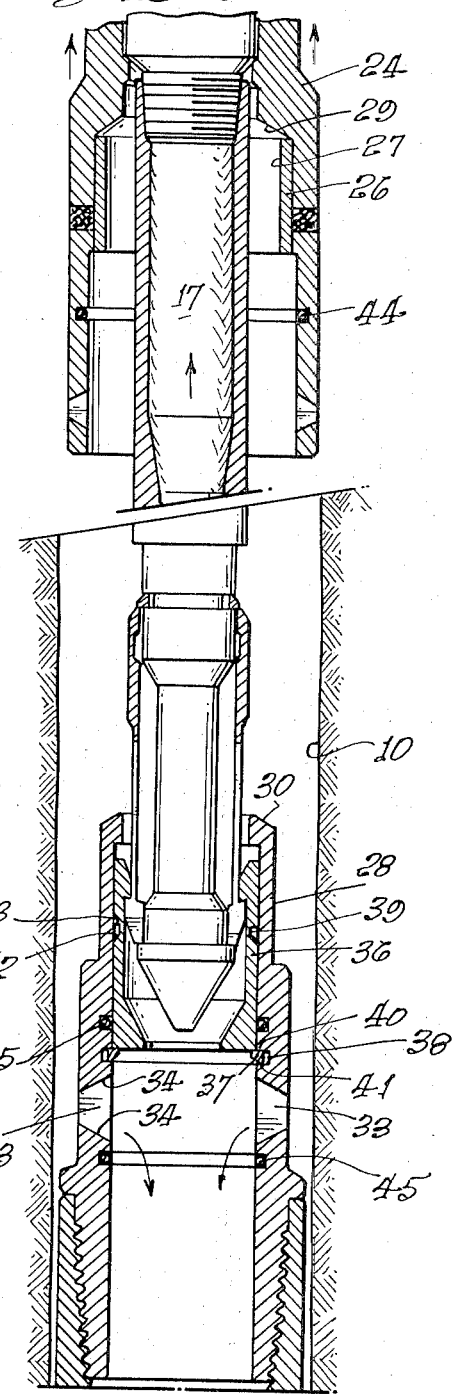

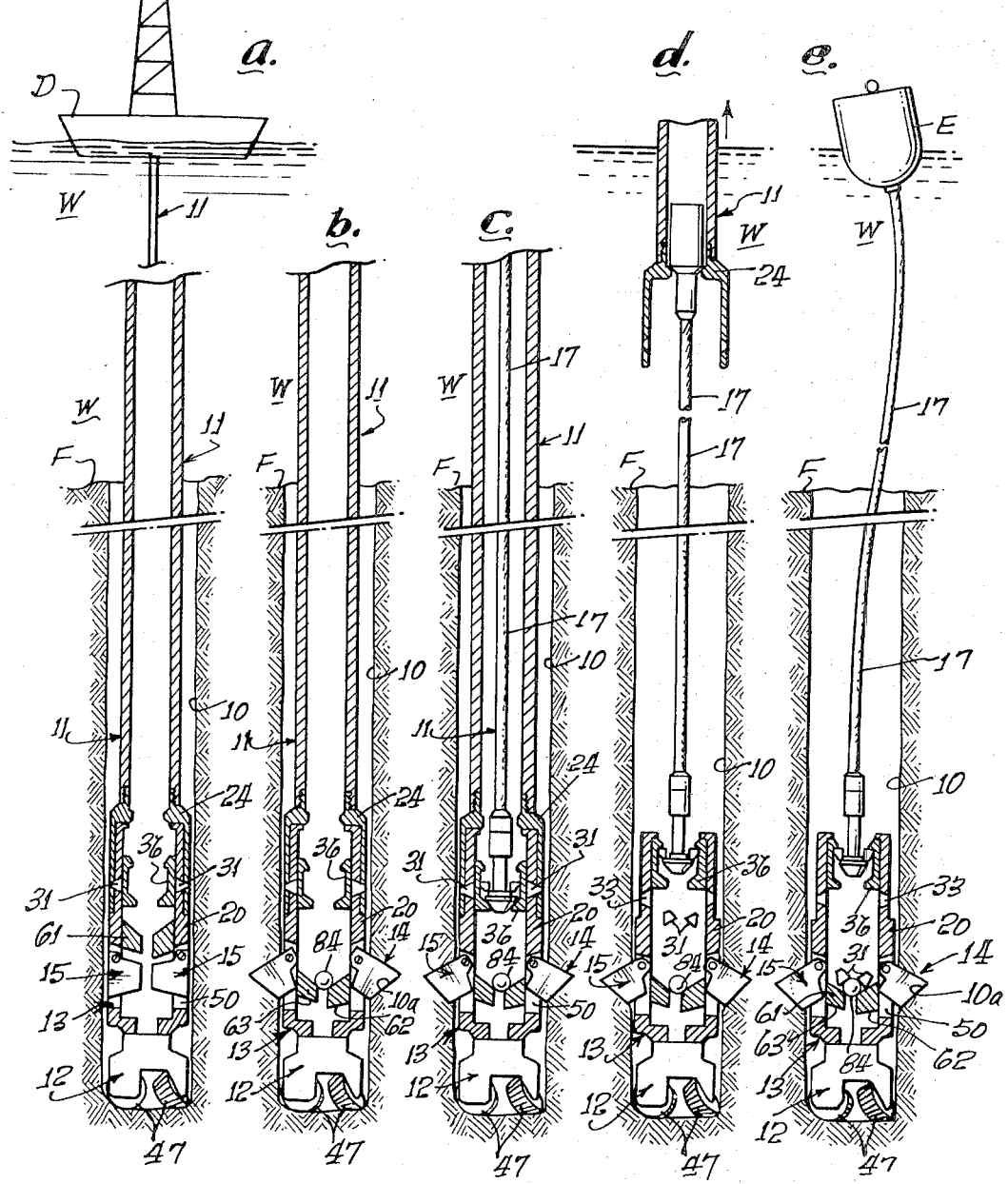

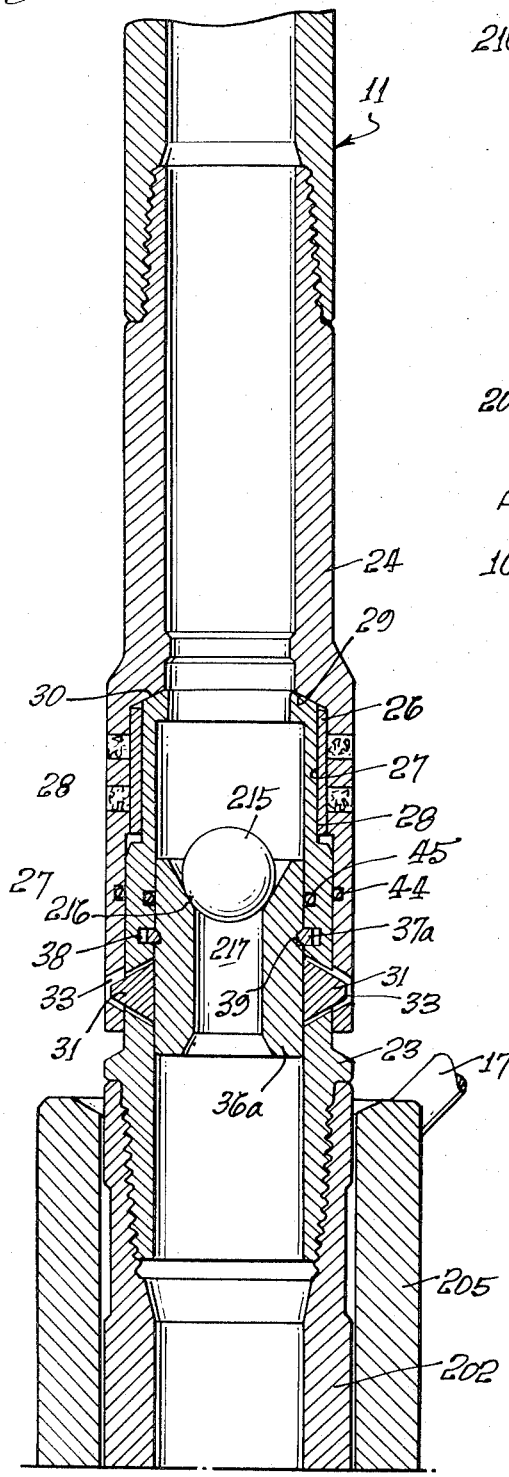
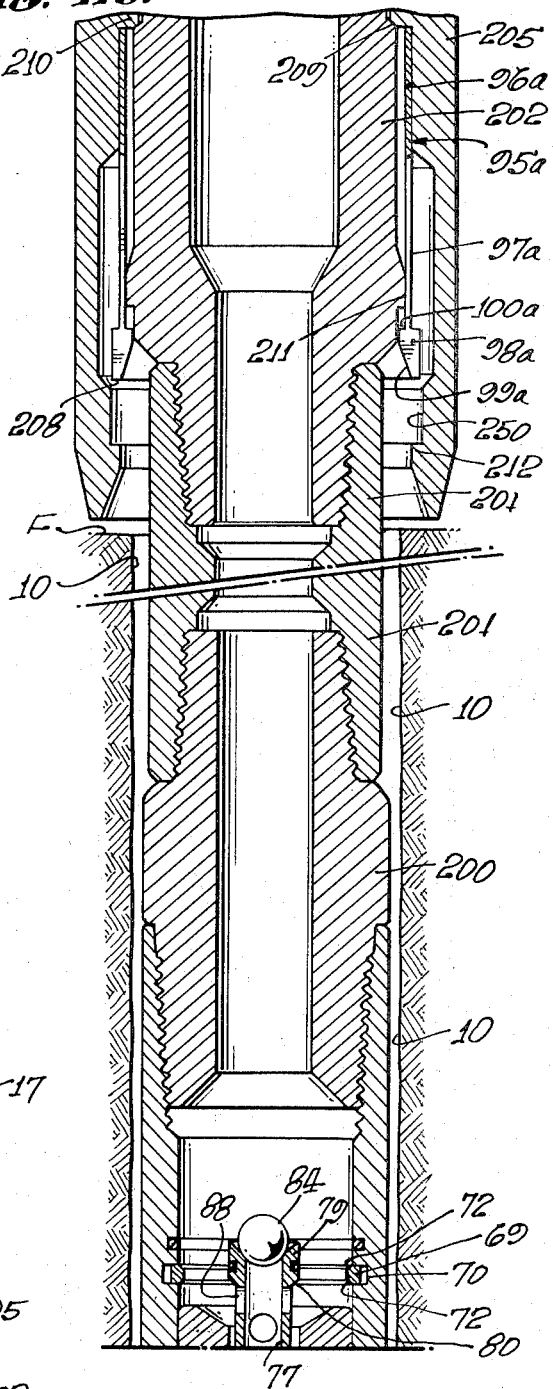

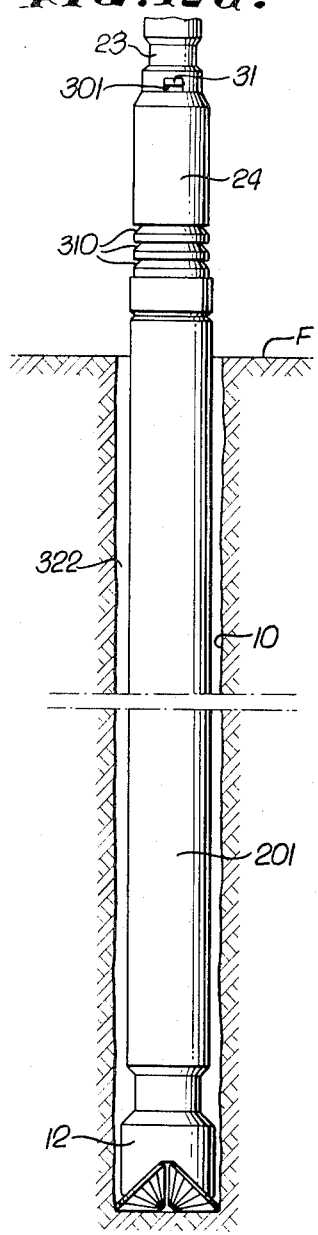
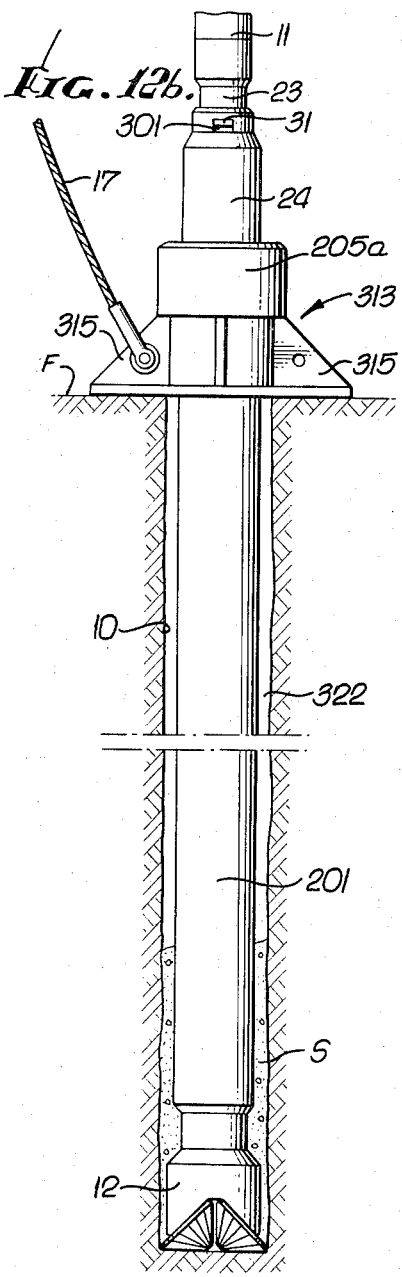
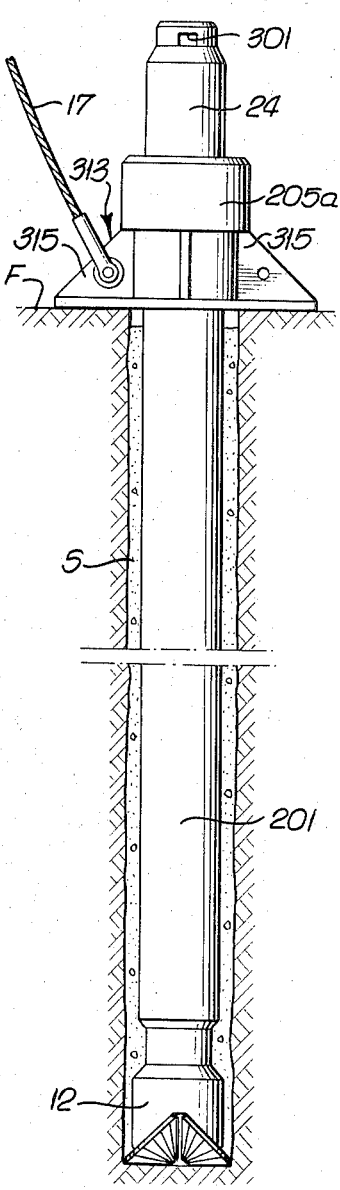
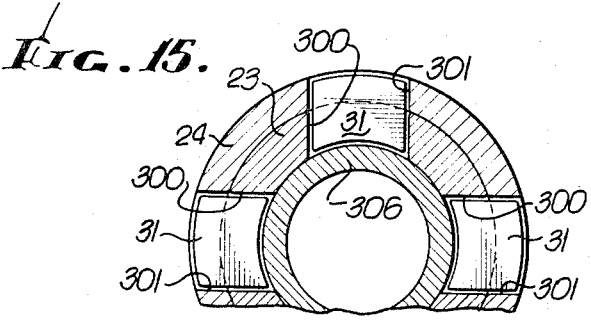

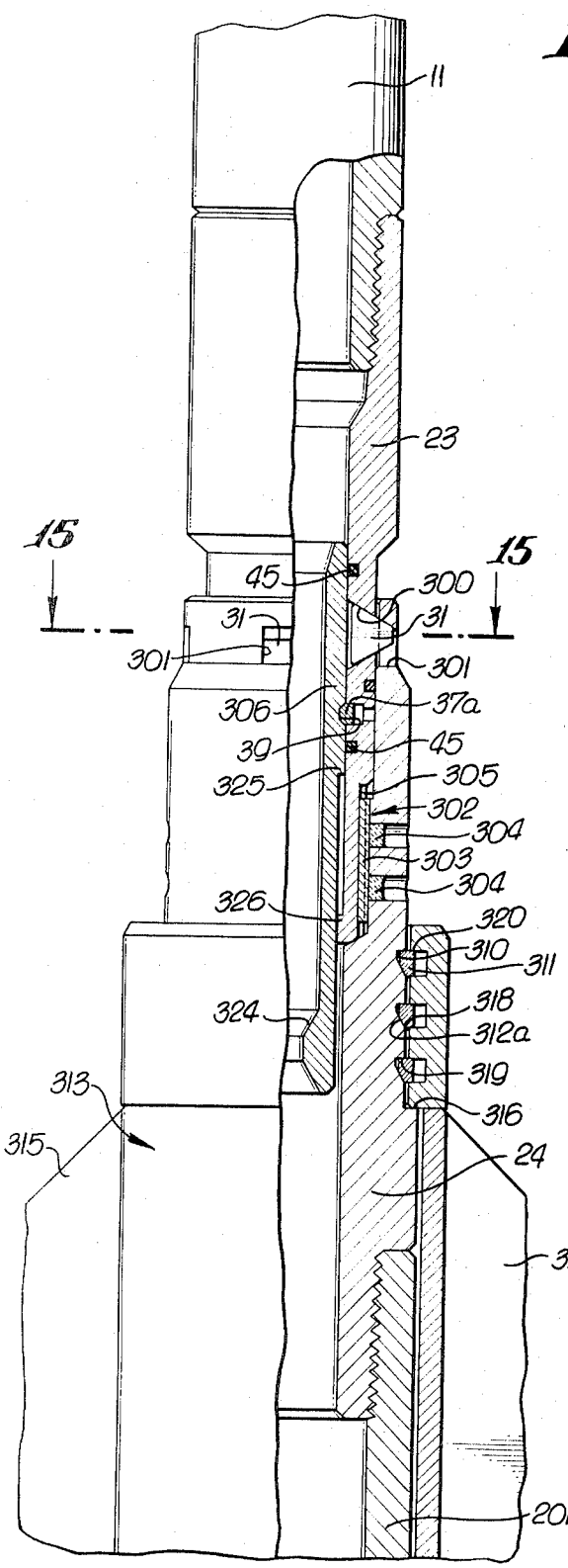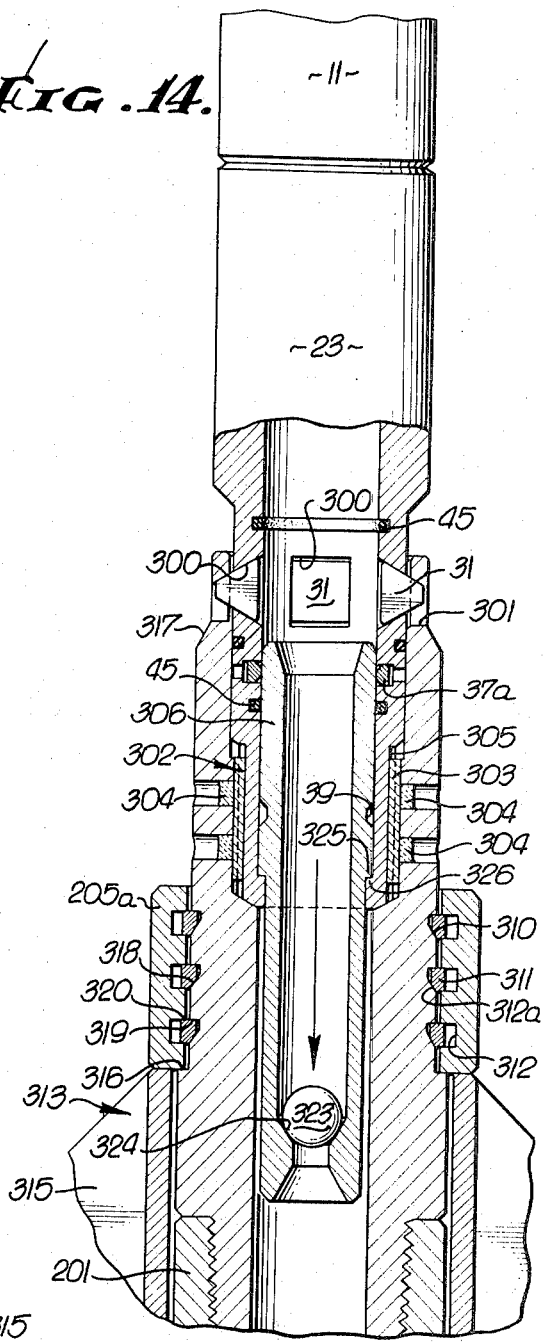

DISCONNECTIBLE TORQUE AND AXIAL LOAD TRANSMISSION APPARATUS

This application is a division of application Ser. No. 190,181 now U.S. Pat. No. 3,753,431, filed Oct. 18, 1971, for "Disconnectible Torque and Drilling Weight Transmission Apparatus for Drill Bits," which is, in turn, a division of application Serial No. 132,993 now abandoned, filed Apr. 12, 1971, for "Underwater Anchor Apparatus and Methods of Installation," which is, in turn, a continuation-in-part of application Ser. No. 23,700 now abandoned, filed Mar. 30, 1970, for "Underwater Anchor Apparatus and Method of Installation." Application Ser. No. 335,648 was filed Feb. 26, 1973 as a continuation of application Ser. No. 132,993 now abandoned.

The present invention relates to disconnectible tubular apparatus, such apparatus being particularly useful in drilling underwater bore holes, and embodied in drilling string attached to a drill bit, to permit recovery of the drilling string after the bore hole has been drilled.

In drilling certain bore holes in formations, such as in formations underlying an ocean or other body of water, it may not be possible nor desirable to recover the drill bit from the bore hole. Accordingly, a lower portion of a drill pipe string connected to the drill bit is releasably secured, through a disconnectible apparatus, to an upper portion of the drill pipe string extending to the drilling rig, the disconnectible apparatus being capable of transmitting drilling torque and drilling weight from the upper pipe portion of the lower pipe portion and to the drill bit. Such an apparatus is illustrated and described in U.S. Pat. No. 2,988,145.

In the apparatus disclosed in the above patent, one drive member is piloted within another drive member, axial separation between the members being prevented by dogs or keys held in effective position by a retainer, torque between the members being transmitted through the dogs or keys.

By virtue of the present invention, a disconnectible apparatus capable of being incorporated in a drilling string is provided, in which the torque is transmitted directly from one drive member to another drive member without the necessity for being transmitted through dogs, keys, or other devices that prevent axial separation between the members, release of the dogs or keys enabling the members to be axially separated. Relieving the dogs or keys of the towque load prevents their damage, with the undesirable possibility of preventing disconnection of the apparatus when desired. In addition, by directly transmitting torque from one member to the other, the apparatus has a greater torque transmitting capacity. Another advantage to applicants' disconnectible apparatus is the greatest facility with which it can be assembled, and the assurance that its disconnection will be effected whenever desired, enabling the drilling string above the point of disconnection to be removed and elevated to the drilling rig. Moreover, the apparatus will remain in proper condition for transmitting drilling torque and drilling weight through it, until the apparatus is purposely disconnected.

This invention possesses many other advantages and has other purposes which may be made more clearly apparent from a consideration of several forms and methods embodying the invention. These forms and methods are shown and described in the present specification and in the drawings accompanying and constituting a part thereof. They will now be described in detail, for the purpose of illustrating the general principles of the invention; but it is to be understood that such detailed description is not to be taken in a limiting sense.

Referring to the drawings:

FIGS. 1a and 1b together constitute a longitudinal section through an apparatus embodying the invention disposed in a bore hole underlying a body of water, the apparatus extending to a drilling vessel, parts being disclosed in side elevation, FIG. 1b being a lower continuation of FIG. 1a;

FIG. 2a is a cross-section taken along the line 2a–2a on FIG. 1a;

FIG. 3 is an enlarged cross-section taken along the line 3—3 on FIG. 1a;

FIG. 4 is an enlarged cross-section taken along the line 4—4 of FIG. 1b;

FIG. 5 is an enlarged cross-section taken long the line 5—5 on FIG. 1b;

FIG. 6 is an enlarged cross-section taken along the line 6—6 on FIG. 1b;

FIG. 6a is an enlarged fragmentary section of a portion of the latch arrangement for securing the anchor cable to the anchor apparatus;

FIG. 6b is an enlarged fragmentary section of a portion of the anchor apparatus;

Figure 1A:
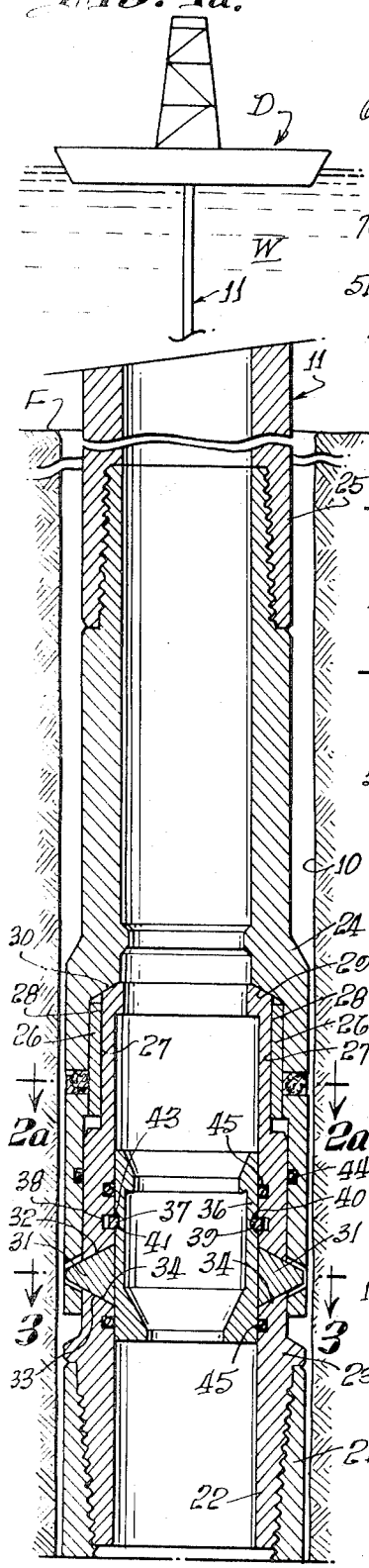
Figure 1B:
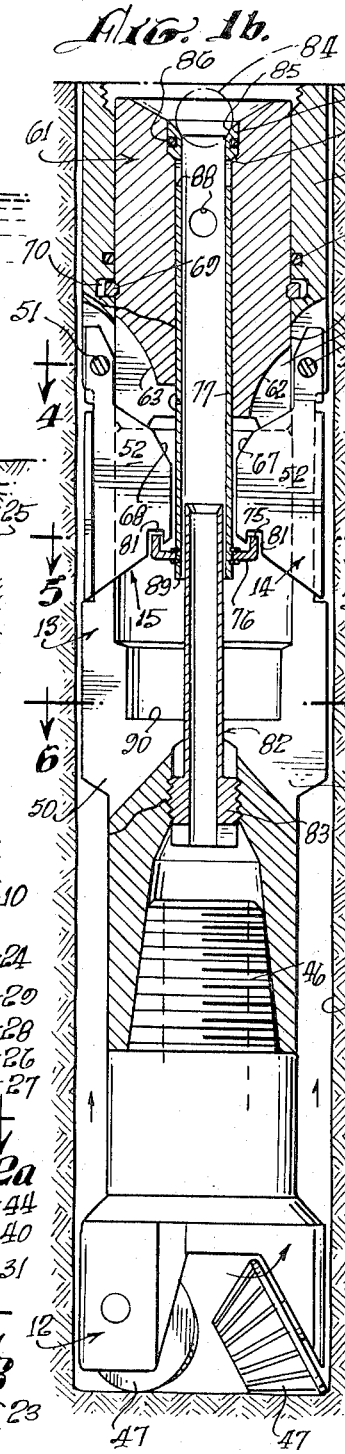
Figure 2:
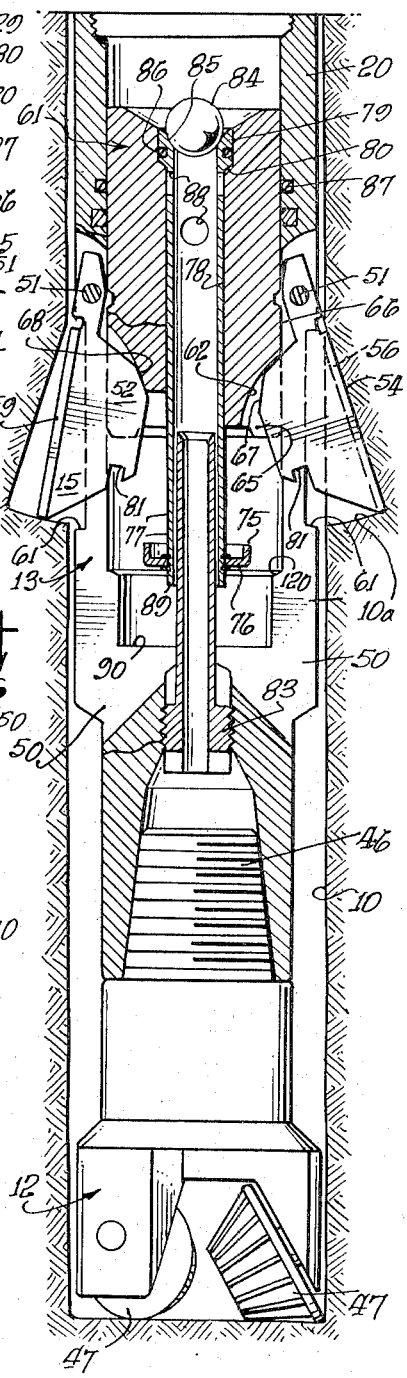
FIG. 2 is a longitudinal section corresponding to FIG. 1b, with the anchor or bearing members partially expanded against and into the formation.

FIGS. 7a, 7b and 7c together constitute a section corresponding to FIGS. 1a and 1b, illustrating the anchor members of the apparatus fully expanded and retained in an undercut portion of the bore hole and with the anchor cable latched to the anchor apparatus, FIGS. 7b and 7c being lower continuations of FIGS. 7a and 7b, respectively;

FIG. 8 is a longitudinal section illustrating the lower portion of the anchor cable latched or coupled to the set anchor;

FIG. 9 is a longitudinal section similar to FIG. 8 illustrating the drill pipe released from the set anchor and elevated to the drilling vessel;

FIGS. 10a, b, c, d and e are diagrammatic views illustrating the operational steps in drilling the bore hole, setting the anchor therein, securing the lower end of the anchor cable to the anchor, releasing and removing the drill pipe from the bore hole and to the drilling vessel, and securing the upper end of the anchor cable to a float, or the like;

FIGS. 11a and 11b together constitute a longitudinal section through a modified form of anchor apparatus, FIG. 11b being a lower continuation of FIG. 11a;

FIGS. 12a, 12b and 12c are diagrammatic views illustrating operational steps in anchoring another specific embodiment of apparatus in the bore hole, including drilling the bore hole, securing the lower end of the anchor cable to the anchor apparatus, cementing the anchor apparatus in the bore hole, and releasing and removing the drill pipe from the apparatus;

FIG. 13 is a combined side elevational view and longitudinal section through another embodiment of anchor apparatus, corresponding to FIGS. 11a, 11b;

FIG. 14 is a view similar to FIG. 13 disclosing the drill pipe in condition for release from the anchor apparatus;

FIG. 15 is an enlarged cross-section taken along the line 15—15 in FIG. 13.

The apparatus illustrated in the drawings contemplates the drilling of a bore hole 10 extending downwardly from the floor F of a body of water W, such as an ocean, from a drilling vessel D floating on the surface of the water. The bore hole is drilled through rotation of a drill string 11 extending from the drilling vessel down to a drill bit 12 secured to its lower end, which can be of any suitable specific type, the drill bit being attached to an intervening anchor 13 having initially retracted, but expandable, anchor members or flukes 14, 15 mounted thereon, which are expanded outwardly to enlarge the diameter of the bore hole over a short distance and produce a downwardly facing shoulder 16 therein (FIG. 7c) against which the upper surfaces of the anchor members engage, the anchor members being retained in their expanded condition. After the anchor has been secured to the formation, a cable or chain 17 is lowered along the drill and latched to the anchor 13, the drill string then being released from the anchor and elevated from the bore hole 10 and to the drilling vessel D. The anchored cable or chain 17 extends to the drilling vessel and may, if desired, be attached to a suitable buoy E (FIG. 10e) for ready future availability at the surface of the water.

Aa disclosed in FIGS. 1 to 10, inclusive, an anchor apparatus 13 is illustrated to which the lower end of the string of drill pipe 11, or other drilling string, is releasably secured. The anchor apparatus includes a tubular body member 20 having an upper box 21 threadedly attached to the lower pin 22 of a torque sub 23 piloted within the lower portion of an outer housing or coupling member 24 threadedly attached to a drill pipe section 25 thereabove, the drill pipe extending to the drilling vessel D. The coupling member 24 is in torque transmitting relation to the torque sub 23 through the provision of diametrically opposed torque slippers or shoes 26 welded, or otherwise suitably secured, to the inner portion of the coupling member and having chordal surfaces 27 engaging companion external flat or chordal surfaces 28 formed on the upper portion of the torque sub. Drilling weight is transmittable from the drilling string 11 to the downwardly facing housing shoulder 29 which bears against the upper end 30 of the torque sub.

The coupling member 24 is initially releasably secured to the torque sub 23 by a plurality of dogs 31 having upper and lower outwardly converging surfaces 32 fitting within radial slots 33 formed in and through the torque sub and engaging companion convergent upper and lower sides 34 of the slots, the outer portions 35 of the dogs fitting within companion slots 36a in the lower portion of the coupling member. The coupling dogs 31 are retained in their outer position by a back-up, retaining or holding sleeve 36 within the torque sub 23 extending across the inner portions of the dogs and releasably held in position by a split contractable latch ring 37 received partially within an internal circumferential groove 38 in the torque sub and partially within an external groove 39 in the holding sleeve. The upper side 40 of the latch ring is normal to the axis of the apparatus; whereas, its lower end or corner 41 is tapered or beveled in an upward inward direction, being engageable with a companion tapered side 42 of the external groove 30. Thus, the holding sleeve 36 is prevented from moving downwardly from its latched position in the torque sub by engagement of the upper side 43 of the external groove 39 with the latch ring 37. However, the exertion of sufficient upward force on the holding sleeve will cause its inclined surface 42 to cam the split latch ring 37 completely out of the external sleeve groove 38 to allow the holding sleeve 36 to be pulled upwardly to a position above the coupling dogs 31, whereupon the latter can drop into the torque sub 23 and effect release of the coupling member 24 from the torque sub. Leakage of fluid between the coupling member and the exterior of the torque sub is prevetned by a suitable side seal ring 44 mounted in the coupling member and engaging the periphery of the torque sub. Leakage of fluid from the interior of the torque sub into its slot 33 is prevented by side seal rings 45 carried by the torque sub on opposite sides of the slots 33 and engaging the periphery of the holding sleeve 36.

The drilling torque and drilling weight is transmitted from the drill string 11 and its lower coupling member 24 to the torque sub 23 and the tubular body member 20 of the anchor 13, and to a suitable drill bit 12 secured to the lower end of the anchor body, as by threadedly connecting the upper threaded pin 46 of the bit with the lower box of the body member. The bit has cutters 47 that will cut the hole 10 to a required diameter and to the required depth, the depth of hole produced depending upon the character of the formation being drilled. If the formation is relatively hard, then the bore hole 10 drilled need only be of the order of about 50 feet in depth, but if the ocean floor and formation therebelow are composed of a relatively soft formation, then it may be necessary to drill the bore hole through the soft material and into harder material. As an example, the bore hole drilled may extend from about 50 to about 300 feet below the ocean floor F.

Assuming the bore hole 10 to have been drilled to its desired depth, the anchor 13 is then firmly secured or locked to the formation against upward movement. The anchor includes a plurality of circumferentially spaced anchor members or flukes 14, 15 disposed within slots 50 extending through the wall of the tubular body member, each anchor member being pivotally mounted on a hinge pin 51 extending across its slot and suitably secured to the body member. Each anchor member includes a central web 52 slidable in the slot and extending inwardly of the body to a substantial extent when the anchor members or flukes are in their retracted positions. One or more of the anchor members 14 are constituted as formation cutters expandable outwardly during rotation of the anchor apparatus to enlarge the diameter of the bore hole and produce the downwardly facing shoulder 16 therewithin. Other of the anchor members 15 are adapted to provide bearing elements engageable with such formation shoulder when expanded outwardly of the body member. As specifically illustrated (FIG. 5), a diametrically opposite pair of anchor members are constitued as cutters 14, having leading or cutting faces 53 and longitudinally extending cutting edges 54 for cutting into the wall of the bore hole to enlarge its diameter as the cutters are expanded outwardly. Initially, the cutting edges 54 are disposed within the external periphery 55 of the body member 20, having a trailing wing portion 56 to increase the shoulder bearing surface 57 of the cutter member, the wing lying within a recess 58 in the body member and merging into the adjacent slot 50 receiving the cutter member 14. The remainder of the anchor members 15 have bearing pads or shoes 59 integral with and disposed at the other end of the web portion 52, each bearing pad including oppositely directed wing portions 60 received within recesses 61 in the exterior of the body member on opposite sides of the slot 50 receiving the web 52. The bearing pads or shoes 59, 60 are also initially confined entirely within the perimeter 55 of the body member 20.

An expander 61 is mounted within the body member 20 above the anchor elements 14, 15, the expander member having lower downwardly tapering surfaces 62, 63 adapted to engage the upper portions of the webs 52 of the anchor members for the purpose of swinging them about their hinge pins 51 outwardly of the body member. The expander has a pair of lower tapered surfaces 62 engageable with the webs 52 of the cutters 14 and tapered expander surfaces 63 disposed axially above the lower surfaces 62 and adapted to engage the webs of the non-cutting anchor members 15, so that downward shifting of the expander 61 within the body 20 will first commence outward expansion of the cutters 14 and, after they have been expanded outwardly to a partial extent, will commence expanding the bearing anchor members 15 into the cavity 10a produced by the cutters 14. The lower portion of the expander is provided with grooves 65 adapted to receive the web portions 52 of the bearing pad members 15, so that the expander can move downwardly to engage the lower expander surfaces 62 with the cutter members 14 prior to engagement of the upper expander surfaces 63 with the bearing pad members 15. The expansion of the cutters occurs to an extent in which the cylindrical periphery 66 of the expander is disposed behind holding surfaces 67 on the cutter members 14, the expander being movable downwardly to a further extent until the periphery 66 is also disposed behind the holding surfaces 68 on the pad bearing members 15, at which time the cutters 14 and the pad bearing members 15 are all expanded outwardly to the same extent, capable of engaging the downwardly facing shoulder 16 constituting the upper end of the enlarged diameter bore hole portion 10a produced by the cutters 14 (FIG. 7c).

Initially, the expander 61 is retained in its upper position, in which the anchor members 14, 15 are retracted, by a split inherently contractable latch ring 69 disposed in an internal groove 70 in the body member, with its inner portion received within a peripheral groove 71 in the expander. The sides 72 of the inner portion of the latch ring taper or converge toward each other, engaging companion sides 73 of the expander member groove 71, such that the exertion of sufficient downward force on the expander will expand the latch ring 69 fully into the internal groove 70 and out of the external groove 71, to permit downward movement of the expander member 61 along the tubular body member 20 and into engagement with the cutters 14 and the bearing pad members 15.

The anchor members 14, 15 are initially retained in their retracted position by the upwardly extending portion 75 of a retainer ring 76 suitably secured to the lower end of an internal sleeve 77 extending upwardly through a central axial passage 78 of the expander member 61, this sleeve having an upper head 79 initially seating upon an upwardly directed shoulder 80 in the expander. The internal sleeve 77 moves downwardly with the expander to release the retaining ring portion 75 from the lower recesses or slots 81 in the webs 52 of the anchor members 14, 15, the sleeve moving downwardly along a lower sleeve 82 initially extending partially into the lower end of the internal sleeve, and with its lower end 83 threadedly secured to the tubular body 20 below the body slots 50.

The expander 61 and the upper internal sleeve 77 together constitute a piston subject to the pressure of the fluid in the drill string 11 and torque sub 23 thereabove, when a suitable tripping ball 84 is dropped through the tubular string 11 onto a valve seat 85 provided on the upper head end of the internal sleeve. Leakage of fluid between the sleeve head 79 and the expander 61 is prevented by a suitable side seal ring 86 mounted in the head and engaging the expander. Similarly, leakage of fluid between the expander 61 and the tubular body member 20 is prevented by a suitable side seal ring 87 mounted in the body member and slidably engaging the periphery of the expander. The upper internal sleeve 77 has a plurality of ports 88 immediately below its head disposed initially in closed position when the head engages the expander shoulder 80, but which are adapted to be opened as a result of full downward movement of the expander 61 and sleeve 77 within the tubular member 20 to a position in which the lower end 89 of the sleeve engages an upwardly facing body shoulder 90, the expander 61 then moving downwardly along the internal sleeve 77 so that the ports 88 are disposed above the upper portion of the expander, enabling fluid to be pumped through the apparatus after the anchor members 14, 15 have been expanded outwardly to their fullest extent, as described hereinbelow (FIG. 7c).

After the cutters 14 have enlarged the bore hole diameter, and the anchor members 14, 15 have all been expanded outwardly to their fullest extent, an anchor cable 17 is lowered down through the string of drill pipe 11 and is latched to the anchor apparatus 13. The lower end of the cable 17 is secured, in a known manner, to a cable connector 91 (FIGS. 7a, 7b) threaded onto the upper end of a stem 92, which, in turn, is threaded onto the upper end of a spear 93 having a terminal tapered portion 94. This spear carries a latch device in the form of a collet sleeve 95 having a circumferentially continuous upper portion 96 from which depend spring-like arms 97 terminating in lower feet or fingers 98 having downwardly tapering outer surfaces 99 and upwardly facing outwardly directed shoulders 100. The sleeve 95 is initially releasably secured to the spear 93 by a split expansible latch ring 101 mounted in an external circumferential groove 102 in the spear and disposed with a companion internal groove 103 in the upper portion of the sleeve, this ring having an upper outer tapered or bevelled corner 104 engageable with a companion tapered side 105 of the internal sleeve groove. The sleeve 95 is prevented from dropping downwardly along the spear by engagement of the tapered side 105 with the latch ring 101, its upward movement along the spear being prevented by engagement of the upper end 106 of the sleeve with the lower end 107 of the stem 92, which, for example, may be about 10 feet long.

The cable 17 is of a sufficient length as to extend from the region of anchoring the apparatus 13 against the formation to the drilling vessel D. Its upper end is slightly connected to an upper cable connector 108, which, in turn, is threadedly secured to a cable catcher 109 having an outside diameter greater than the outside diameter of the cable connector 108 and providing a downwardly facing shoulder 110 adapted to be engaged by an upwardly facing pick-up shoulder 111 provided on the interior of the outer housing or coupling member 24, as described hereinbelow.

The cable 17, with the stem 92 and latching mechanism 93, 95 secured thereto, is lowered from the drilling vessel D through the drill pipe 11 until the lower end 94 of the spear engages the internal shoulder 112 of the holding sleeve 36. Prior to such engagement, the lower end 107 of the stem 92 bears against the upper end 106 of the collet sleeve and forces its fingers 98 through the upper end of the holding sleeve to a position below a downwardly facing internal shoulder 113 of the sleeve, the collet arms 97 and the fingers 98 expanding outwardly so that the fingers extend under the sleeve shoulder 113, as disclosed in FIG. 7b. An upward pull is now taken on the cable 17, which is transmitted through the stem 92 to the spear 93, the latter moving upwardly until its latch ring 101 engages the shoulder 105 of the collet sleeve 95, moving the latter upwardly with it until its finger surfaces 100 engage the sleeve shoulder 113. A continuation of the upwardly directed pull or strain on the cable 17 then causes the latch ring 101 to be cammed into its groove 102 to a position released from the sleeve 95, the spear moving upwardly until its lower shoulder 115 engages the lower ends of the fingers 98, with a peripheral surface 116 above the shoulders being disposed behind the fingers 98 to retain them in their expanded condition under the holding sleeve shoulder 113. When this occurs, the latch ring 101 has shifted to a position above the collet sleeve 95. The taking of a sufficient upward strain on the cable 17 then causes the internal sleeve 23 to cam the latch ring 37 out of its groove 39, the internal sleeve being picked upwardly within the torque sub 23 until it engages the internal shoulder 117 at the upper portion of the torque sub (FIG. 8). At this time, the lower end of the holding sleeve 36 is disposed above the latch ring 37, which inherently recontracts partially into the bore of the torque sub and under the holding sleeve, the holding sleeve being above the coupling dogs 31, which are then free to drop inwardly from the slots 33 and to the interior of the torque sub 23, permitting the coupling member 24 to be moved upwardly off the torque sub (FIG. 9).

The tubular string 11 can now be moved upwardly and stripped over the cable 17, which is now coupled to the anchor apparatus 13. The lower end of the cable can only move downwardly to the extent in which the spear engages the holding sleeve shoulder 112, the sleeve, in turn, engaging the latch ring 37. The lower end of the cable cannot be moved upwardly beyond the extent illustrated in FIG. 8. It is unnecessary to secure the cable 17 at the drilling vessel D since the upward removal of the drill string 11 will cause the shoulder 111 of the coupling member 24 to engage the cable catcher shoulder 110, which will then pull the catcher 109 with the string of drill pipe 11 upwardly back to the drilling vessel. The cable 17 is appropriately secured, as to a buoy E, and the cable catcher 109 removed from the upper cable connector 108 to permit the coupling member 24 to be removed therefrom.

In the anchoring of the cable 17 to the formation, the drill bit 12 is secured to the tubular body 20 of the anchor 13 and the upper portion of the anchor then secured to the torque sub 23, which is attached to the lower coupling member 24 of the drill string 11 by means of the coupling dogs 31 and the holding sleeve 36, the anchor members 14, 15 being in retracted position, all parts occupying the relative relationship illustrated in FIGS. 1, 10a. The apparatus is then lowered by means of the string of drill pipe 11 from the drilling vessel D through the water W to the ocean bottom F, where drilling commences by rotating the drilling string and the drill bit 12 while applying suitable drilling weight to the bit (FIG. 10a). Drilling fluid is pumped down through the drill string, being conducted through the anchor apparatus 13 and through the drill bit for discharge therefrom to carry the cuttings upwardly around the apparatus 13 and the drill pipe 11 to the ocean floor. Drilling proceeds until the hole has been drilled to the desired depth. When this occurs, the trip ball 84 is dropped through the string of drill pipe 11 and will come to rest upon the companion seat 85 of the piston tructure 61, 77, closing the passage through the latter and permitting pressure to be imposed on the drilling fluid in the string of drill pipe, which is exterted downwardly on the piston structure, camming the latch ring 71 outwardly and moving the ezpander 61 and its inner sleeve 77 downwardly to release the hook latch ring 75, 76 from the anchor members 14, 15. The drill string is rotated while the piston or expander is shifting downwardly, the lower expander surfaces 62 first engaging the cutter members 14 to shift them outwardly into engagement with the wall of the formation.

As drilling proceeds and the groove 10a is cut in the formation wall of increasing diameter, the piston member 61, 77 moves downwardly to a further extent, until the upper expander surfaces 63 engage the bearing anchor members 15 to expand them outwardly, the extent of expansion trailing the expansion of the cutters 14. Continued application of pressure on the piston continues to shift the anchor member 14, 15 outwardly, while the drilling string 11 and cutters 14 and anchor members 15 are being rotated, to enlarge the well bore 10a to the desired extent, determined by sliding of the piston periphery 66 along the inner portions of the cutters 14, the piston moving downwardly to still a further extent until the peripheral portion 16 of the piston then slides downwardly along the bearing pad anchor members 15, all of the anchor members 14, 15 then being expanded outwardly to their fullest extent (FIG. 10b). The downward movement of the piston 61, 77 and the fact that the anchor members 14, 15 have been expanded outwardly to their fullest extent is indicated to the operator on the drilling vessel by the fact that the lower end 89 of the sleeve 77 has engaged the body shoulder 90 and is shifted relatively upwardly of the expander 61 to a position in which the ports 88 are open, causing a drop in the fluid pressure, since it can now circulate downwardly through the ports 81 and sleeve 77 and drill bit 12 into the bore hole. When the anchor members have been expanded outwardly to the fullest extent, the lower end of the expander will have engaged a shoulder 120 in the body 20, precluding further downward movement, at which time the upper end of the expander is disposed slightly below the latch ring 69, which will recontract partially thereabove to prevent inadvertent upward movement of the expander 61 along the anchor members, insuring their retention in their outer position underlying the formation shoulder 16 produced by the cutters 14.

The cable 17 and coupling assembly 91, 92, 93, 95 is then lowered through the string of drill pipe 11 in the manner described above, to latch the lower mechanism 93, 95 to the holding sleeve 36, (FIG. 10c), whereupon an upward pull is taken on the cable to shift the holding sleeve above the coupling dogs 31, disconnecting the coupling member 24 from the torque sub 23 and permitting the drill string 11 to be stripped upwardly along the cable 17, all portions of the drill string being elevated, including the coupling member 20, to the drilling vessel D (FIG. 10d). The upper cable connector 108 can then be secured in any manner. As, for example, it may be attached to a buoy E floating in the body of water W so as to mark its location for subsequent use (FIG. 10e).

A plurality of cables 17 can be anchored into the formation at desired spaced intervals from one another, their upper ends then being attached to buoys E, whereupon a drilling vessel may be disposed over a desired site for drilling a well bore and the anchor cables 17 then secured to appropriate regions of the drilling vessel, with the proper tension imposed thereon, so as to retain the drilling vessel, within reasonable limits, over the drill site.

The expanded anchor members 14, 15 have a very great holding force in relatively hard formations, the holding force exceeding the tensile strength of the cable 17, which, for example, may be a steel cable two inches in diameter. If desired, the anchor apparatus 13 can be connected in the bore hole. This action can occur after the anchor members 14, 15 have been expanded outwardly to their fullest extent, with the ports 88 in their open condition and prior to lowering of the cable 17 and its latching mechanism into the drill pipe. A suitable charge of cement slurry is pumped down the drill pipe 11, passing through the ports 88 into the central passages through the sleeves 77, 82 and through the drill bit 12 into the well bore 10, flowing upwardly through the well bore to fill the latter and the enlarged well bore portion 10a to the upper portion of the tubular body member 20. Thereafter, the cable 17, with the latching mechanism 93, 95 secured to its lower portion, can be lowered through the string of drill pipe and anchored to the internal sleeve 36 and the torque sub 23, in the manner described above, the coupling dogs 31 being released to permit upward removal of the drill pipe 11 along the cable 17 therewithin. When the anchor device 13 is cemented in the bore hold 10, 10a, the cable 17 should be lowered through the drill pipe 11 before the cementitious material begins setting, to offer assurance that such material is in a fluent state and that any portions thereof within the holding sleeve 36 will not interfere with appropriate latching of the collet 95 to the sleeve, the backing up of the collet fingers 98 by the spear 93, and the upward elevation of the holding sleeve 36 above the coupling dogs 31, to release the latter and the coupling member 24 from the torque sub 23.

In the form of apparatus illustrated in FIGS. 11a, 11b, the same drill bit 12 and anchor 13 arrangement is employed as in the other inventive embodiment. The tubular body member 20 is threadedly secured to a sub 200, which is, in turn, threadedly secured to the lower end of a string of drill collars 201 of sufficient length as to extend from the region just above the ocean floor F to the sub 200 when the bore hole 10 has been drilled to its final depth. The upper end of the drill collar string 201 is threadedly secured to a coupling member 202, which is, in turn, threadedly attached to the torque sub 23 piloted within the coupling member 24, which is, in turn, threadedly attached to the lower end of a string of drill pipe 11 extending up the drilling vessel D, and by means of which the entire combination is rotated and drilling weight applied to the drill bit 12. The dogs 31 fit in aligned coupling member slots 33 to releasably secure the torque sub 23 to the coupling member 24, in the same manner as in the other form of the invention, torque being transmitted between these parts through the torque shoes 26. A back-up or holding sleeve 36a is disposed within the torque sub 23, overlying the dogs 31 to hold then in their coupled position, the holding sleeve being releasably secured in position by means of a split contractable latch ring 37a.

The apparatus described is lowered from the drilling vessel D to the ocean floor F where drilling of the bore hole 10 commences through rotation of the drilling string 11 and the imposition of downweight on the bit 12. The anchor members 14, 15 are then in retracted position. When the hole has been drilled to its final depth, the tripping ball 84 is dropped onto its companion seat 85 on the internal sleeve 77 and fluid pressure applied to the drilling fluid thereabove, while the drill string 11 and anchor 13 are rotated, to enlarge the bore hole 10a and expand the cutters and anchor pads 14, 15 outwardly to their fullest extent, as in the other form of the invention. A latch collar 205 is then secured to the lower end of an anchor chain or cable 17, this anchor collar containing a collet sleeve 95a having a circumferentially continuous upper part 96a and spring-like arms 97a depending therefrom, which are integral with lower fingers 98a having inner shoulders 100a, downwardly inclined inner faces 99a, and lower ends 208 substantially normal to the axis of the apparatus. The latch collar 205, with the chain or cable 17 attached thereto, is then stripped over the string of pipe 11 from the floating vessel D and moved downwardly until it reaches the coupling member 202, the collet fingers 98a sliding past an upwardly facing external shoulder 209 on the coupling member and the lower portion of the collar passing over the coupling member 202 until a downwardly facing inner shoulder 210 on the latch collar engages the coupling member collar shoulder 209, at which time the inner shoulders 100a of the latch fingers are located below a downwardly facing shoulder 211 on the coupling member, the arms 97a inherently tending to locate the fingers in their inward position, as disclosed in FIG. 11b. At this time, an inwardly directed shoulder 212 on the lower portion of the latch collar 205 is disposed under the lower ends 208 of the fingers 98a. The latch sleeve 95a and coupling member 205 are then located immediately above the ocean floor F.

The drill pipe 11 can then be released from the torque sub by dropping a trip ball 215 onto an upper valve seat 216 on the holding sleeve 36a, this trip ball being of bigger diameter than the lower trip ball 84, the latter having been capable of passing through the central holding sleeve passage 217. Fluid pressure is then increased in the drill string 11 above the upper trip ball sufficient to expand the latch ring 37a outwardly and shift the holding sleeve 36a downwardly completely from its location behind the dogs 31. An upward pull can now be taken on the drill string 11 which will shift the dogs 31 inwardly out of engagement with the coupling member 24 and permit the latter to be elevated from the torque sub 23, the drilling string 11 then being retrieved. The upper end of the chain or cable 17 can then be secured to a marker buoy E, or the like, for further use.

Any tendency for the latch collar 205 to move upwardly is limited by engagement of the collar shoulder 212 with the lower ends 208 of the fingers 98a, the shoulders 100a of which are then brought into engagement with the downwardly facing shoulder 211 in the coupling member 202, the fingers being held under the shoulder 211 by the inner cylinder holding surface 250 of the collar 205. Downward movement of the latch collar 205 along the coupling member 202 is limited by the engagement of the collar shoulder 210 with the coupling member shoulder 209. Thus, the lower end of the cable 17 remains coupled to the coupling member 202 and to the drill collars 201 and anchor 13, the anchor members 14, 15 of the latter being firmly secured under the formation shoulder 16.

If desired, and prior to release of the drill pipe string 11 from the torque sub 23, cementitious material can be pumped down through the drill pipe 11, passing through the anchor 13 and discharging from the drill bit 12 for upward passage therearound, around the anchor member 13 and annulus surrounding the drill collars 201 to the ocean floor F. Hardening of the cement will more securely anchor all of the members in the bore hole 10 and will also protect them against corrosion. The latch collar 205, with the lower end of the anchor chain or cable 17 attached thereto, can then be stripped over the string of drill pipe 11 and latched in position, after which the drill pipe string 11 is released from the torque sub 23, in the manner described above.

In the form of apparatus disclosed in FIGS. 12 to 15, the anchor 13 has been omitted. Instead, a string of drill collars 201 of sufficient length to extend from the region just above the ocean floor F to the bottom of the bore hole 10 to be drilled has its lower end secured to a drill bit 12 for drilling the bore hole, and its upper end secured to a coupling member 24 into which is piloted a torque sub 23, the upper end of which is threadedly secured to the string of drill pipe 11 extending up to the drilling vessel D, and by means of which the drill collar string 201 and rotary bit 12 are rotated for the purpose of drilling the hole downwardly from the ocean floor to the desired depth. The torque sub 23 receives coupling dogs 31 in circumferentially spaced slots 300 extending therethrough, these dogs merging into radial slots 301 in the upper portion of the coupling member 24, in essentially the same manner as in the other forms of the invention, the only essential difference being that the torque sub and coupling member have been inverted with respect to the other forms of the invention. Torque is transmitted from the torque sub 23 to the coupling member 24 through a slidable spline connection 302 in the form of keys 303 suitably secured to the torque member, as by welding material 304, which are slidably received within longitudinal keyways 305 in the torque sub 23. A back-up or holding sleeve 306 is located within the torque sub 23 behind and in overlying relation to the dogs 31 to secure them in their coupled position, the holding sleeve being releasably secured in position by the split contractile ring 37a, receive within an external groove 39 in the back-up holding sleeve 306, in essentially the same manner as illustrated in FIG. 11a. Elastomer seals 45 are provided in the torque sub 23 which sealingly engage the periphery of the back-up sleeve on opposite sides of the dogs 31 and split contractile ring 37a to prevent fluid leakage along the exterior of the holding sleeve.

The coupling member 24 has one or a plurality of peripheral grooves 310 therein adapted to receive inherently contractile latch or lock rings 311 mounted in internal grooves 312 in a latch collar 205a welded or otherwise suitably secured to an anchor member 313 having a lower base 314 and circumferentially spaced vertical ribs 315 secured thereto and to the latch collar. The anchor device 313, with a lower end of an anchor cable or chain 17 secured thereto, is adapted to be slipped over the drill pipe string 11 and will move downwardly thereover until the latch collar 205a engages a stop shoulder 316 on the coupling member 24, at which time the latch rings 311 will be opposite the coupling member grooves 310 and can inherently contract thereinto. The lower inner corners 312a of the latch rings are bevelled so as to be expanded outwardly within the internal grooves 312 as the rings and latch collar move over the upper portion of the coupling member 24, such coupling member having a tapered shoulder 317 below the radial slots 301 to facilitate such outward expansion. When the rings 311 are opposite the coupling member groove 310, they expand partially thereinto, such grooves having lower tapered sides 318 conforming to the ring bevels 312a and upper sides 319 normal to the axis of the coupling member, the upper sides 320 of the rings also being normal to the axis of the coupling member, to prevent upward movement of the latch collar 205a on the coupling member 24 after the rings expand into the coupling grooves 310.

FIG. 12a illustrates the drilling of the bore hole 10 by the drill bit 12, the drilling torque and weight being transmitted from the drill pipe 11 through the torque sub 23 and coupling member 24 to the drill collar string 201. Drilling is continued until the bore hole has reached a depth at which the coupling member 24 and torque sub 23 are adjacent to and above the ocean floor F. The latch collar and base combination 205a, 213 is then secured to the lower end of an anchor chain or cable 17, which are stripped over the string of drill pipe 11 from the floating vessel and moved downwardly until the latch collar 205a engages the coupling member shoulder 316, the latch rings 311 inherently contracting into the coupling member grooves 310 to secure the latch collar to the coupling member 24. A required quantity of cement slurry S is then pumped down through the drill pipe string 11 and the entire apparatus, discharging from the usual ports or nozzles (not shown) in the drill bit 12 and passing upwardly through the bore hole annulus 322, surrounding the string of drill collars 201, toward the ocean floor F, as illustrated in FIG. 12b. A suitable plug or ball member 323 is then dropped through the string of drill pipe 11, coming to rest upon a companion seat 324 in the holding sleeve 306, whereupon the pressure of the fluid in the string of drill pipe is increased to expand the latch ring 307 outwardly and shift the holding sleeve 306 downwardly completely from its location behind the dogs 31, the extent of downward shifting being limited by engagement of a downwardly facing shoulder 325 on the holding sleeve when an upwardly facing shoulder 326 in the lower portion of the torque sub 23, the parts then occupying the relation illustrated in FIG. 14. An upward pull taken on the drill string 11 will cause the dogs 31 to be cammed inwardly out of the coupling member slots 301, releasing the torque sub 23 from the coupling member 24 and allowing the drill string 11 and torque sub 23 to be elevated to the drilling vessel. Hardening of the cement S will securely anchor the string of drill collars 201 and the drill bit 12 in the bore hole 10, the latch collar 205a and the anchored cable or chain 17 secured thereto being incapable of moving upwardly of the couping member 23 and the drill collar string 201 by the latch or lock rings 311.

We claim:

1. In apparatus of the character described: an outer tubular member; an inner tubular member piloted within said outer tubular member; means for releasably coupling said members to each other to prevent their substantial relative axial separation comprising one or more coupling elements in said inner member extending laterally outwardly of said inner member and fitting within said outer member; coengageable menas on said members for transmitting torque therebetween, said coengageable means being independent of said one or more coupling elements; retaining means mounted for shifting within said inner member and disposed behind and engaging said one or more elements to maintain said one or more elements in coupling relation to said members; and means for shifting said retaining means from engaged position with said one or more elements to allow said members to be uncoupled from each other and relatively shifted from torque transmitting relation with respect to each other.

2. In apparatus as defined in claim 1; said members engaging each other to enable axial loads to be transmitted from one of said members directly to the other of said members when said members are coupled to each other.

3. In apparatus as defined in claim 1; said one or more elements comprising one or more keys projecting laterally from said inner tubular member into one or more slots in said outer tubular member; said retaining means comprising a sleeve within said inner tubular member disposed initially behind said one or more keys to prevent their inward movement from said one or more slots; said shifting means shifting said sleeve from retaining position behind said one or more keys to permit their inward movement from said one or more slots.

4. In apparatus as defined in claim 1; said tubular members being disposed in a generally vertical position; said shifting means engaging said retaining means to shift said retaining means upwardly to disengaged position from said one or more elements.

5. In apparatus as defined in claim 1; said tubular members being disposed in a generally vertically position; said shifting means engaging said retaining means to shift said retaining means downwardly to disengaged position from said one or more elements.

6. In apparatus as defined in claim 1; said one or more elements comprising one or more keys projecting laterally from said inner tube member into one or more slots in said outer tubular member; said retaining means comprising a sleeve within said inner tubular member disposed initially behind said one or more keys to prevent their inward movement from said one or more slots; said tubular members being disposed in a generally vertical position; said shifting means shifting said sleeve upwardly from retaining position behind said one or more keys to permit their inward movement from said one or more slots.

7. In apparatus as defined in claim 1; said one or more elements comprising one or more keys projecting laterally from said inner tubular member into one or more slots in said outer tubular member; said retaining means comprising a sleeve within said inner tubular member disposed initially behind said one or more keys to prevent their inward movement from said one or more slots; said tubular members being disposed in a generally vertical position; said shifting means shifting said sleeve downwardly from retaining position behind said one or more keys to permit their inward movement from said one or more slots.

8. In apparatus as defined in claim 1; said one or more elements comprising one or more keys projecting laterally from said inner tubular member into one or more slots in said outer tubular member; said retaining means comprising a sleeve within said inner tubular member disposed initially behind said one or more keys to prevent their inward movement from said one or more slots; said shifting means being disposed in a generally vertical position; said shifting means shifting said sleeve from retaining position behind said one or more slots to permit their inward movement from said one or more slots; said members directly engaging each other to enable axial loads to be transmitted from one of said members to the other of said members when said members are coupled to each other.

9. In apparatus as defined in claim 1; said tubular members being disposed in a generally vertical position; said inner member extending downwardly from said outer member.

10. In apparatus as defined in claim 1; said tubular members being disposed in a generally vertical position; said inner member extending upwardly from said tubular outer member.

11. In apparatus as defined in claim 1; said coengageable means being disposed below said coupling elements; said one or more coupling elements being disposed at the upper end portion of said outer member.

12. In apparatus as defined in claim 1; said one or more elements comprising one or more keys projecting laterally from said inner tubular member into one or more slots in said outer tubular member, said one or more slots being located at the upper end portion of said outer tubular member; said retaining means comprising a sleeve within said inner tubular member disposed initially behind said one or more keys to prevent their inward movement from said one or more slots; said shifting means shifting said sleeve from retaining position behind said one or more keys to permit their inward movement from said one or more slots; said coengageable means being disposed below said keys.

* * * * *

UNITED STATES PATENT OFFICE
CERTIFICATE OF CORRECTION

Patent No. 3,827,258        Dated August 6, 1974

Inventor(s) ARCHER W. KAMMERER, JR. and GARY R. JOHNSON

It is certified that error appears in the above-identified patent and that said Letters Patent are hereby corrected as shown below:

Column 1, line 49: "towque" should read --torque--.

Column 8, line 22: "exterted" should read --exerted--.

line 24: "ezpander" should read --expander--.

Column 11, line 66: "ceive" should read --ceived--.

Column 13, line 11: "couping" should read --coupling--.

line 21: "menas" should read --means--.

Signed and sealed this 12th day of November 1974.

(SEAL)
Attest:

McCOY M. GIBSON JR.
Attesting Officer

C. MARSHALL DANN
Commissioner of Patents